(12) United States Patent
Adams

(10) Patent No.: US 12,233,575 B2
(45) Date of Patent: Feb. 25, 2025

(54) CONCRETE PRODUCT AND METHODS OF PREPARING THE SAME

(71) Applicant: S3 Concrete Technologies, Inc., Marietta, GA (US)

(72) Inventor: Jason S. Adams, Marietta, GA (US)

(73) Assignee: S3 Concrete Technologies, Inc., Marietta, GA (US)

( * ) Notice: Subject to any disclaimer, the term of this patent is extended or adjusted under 35 U.S.C. 154(b) by 658 days.

(21) Appl. No.: 17/382,456

(22) Filed: Jul. 22, 2021

(65) Prior Publication Data
US 2022/0024071 A1    Jan. 27, 2022

Related U.S. Application Data

(60) Provisional application No. 63/057,254, filed on Jul. 27, 2020.

(51) Int. Cl.
*C04B 14/26* (2006.01)
*B28B 11/04* (2006.01)
(Continued)

(52) U.S. Cl.
CPC .......... *B28C 7/0007* (2013.01); *B28B 11/048* (2013.01); *B28C 5/402* (2013.01); (Continued)

(58) Field of Classification Search
None
See application file for complete search history.

(56) References Cited

U.S. PATENT DOCUMENTS

| 5,569,343 A | 10/1996 | Garrigus |
| 5,622,558 A | 4/1997 | Berke et al. |

(Continued)

FOREIGN PATENT DOCUMENTS

| EP | 3094460 A1 | 11/2016 |
| EP | 2771395 B1 | 9/2017 |

(Continued)

OTHER PUBLICATIONS

International Search Report and Written Opinion—PCT/US2020/046221—Nov. 18, 2020.
(Continued)

*Primary Examiner* — Jacob T Minskey
*Assistant Examiner* — Adrien J Bernard
(74) *Attorney, Agent, or Firm* — Jansson Munger & McKinley Ltd.

(57) ABSTRACT

A concrete product set by pouring a concrete slurry includes a concrete mixture, an aluminum-coated colloidal silica admixture, and optionally, at least one reinforcing fiber selected from the group of fibers. As the poured concrete slurry cures, the poured slurry hardens into a composite material product, and the concrete product defines capillary structures that at least in part fill with aluminum-coated silica and lime. Optional graphene oxide may be used in the concrete slurry, in which embodiment the surrounding aggregate and cement is embedded with graphene oxide flakes. A process for placing a jointless and/or fiberless slab made from the concrete product includes preparing a concrete slurry, pouring the concrete slurry onto substrate, and allowing the concrete slurry to cure.

18 Claims, 6 Drawing Sheets

FIG. 2

(51) Int. Cl.
  *B28C 5/40* (2006.01)
  *B28C 7/00* (2006.01)
  *C04B 14/02* (2006.01)
  *C04B 14/06* (2006.01)
  *C04B 14/48* (2006.01)
  *C04B 16/06* (2006.01)

(52) U.S. Cl.
  CPC .......... *C04B 14/026* (2013.01); *C04B 14/062* (2013.01); *C04B 14/48* (2013.01); *C04B 16/06* (2013.01)

(56) References Cited

U.S. PATENT DOCUMENTS

| | | |
|---|---|---|
| 7,571,581 B2 | 8/2009 | Covarrubias |
| 8,211,227 B2 | 7/2012 | Chung et al. |
| 8,784,558 B2 | 7/2014 | Berke et al. |
| 8,951,343 B2 | 2/2015 | Sadiq et al. |
| 9,284,225 B2 | 3/2016 | Oslejs et al. |
| 9,758,379 B2 | 9/2017 | Blair |
| 10,351,473 B2 | 7/2019 | Christiansen |
| 2011/0003904 A1 | 1/2011 | Guevara et al. |
| 2012/0021206 A1 | 1/2012 | Oslejs et al. |
| 2013/0053474 A1 | 2/2013 | Rice et al. |
| 2013/0344390 A1 | 12/2013 | Chen et al. |
| 2014/0060388 A1 | 3/2014 | Sadiq et al. |
| 2015/0299041 A1 | 10/2015 | Wetherell et al. |
| 2016/0115293 A1 | 4/2016 | Aksay et al. |
| 2017/0106342 A1 | 4/2017 | Raveendran-Nair et al. |
| 2018/0050963 A1* | 2/2018 | Hesse .................. C04B 28/146 |
| 2019/0256418 A1* | 8/2019 | Riley ...................... E04C 5/073 |
| 2019/0367420 A1 | 12/2019 | Hartman et al. |
| 2020/0062659 A1 | 2/2020 | Hartman et al. |
| 2020/0087202 A1 | 3/2020 | Adams |
| 2021/0094878 A1* | 4/2021 | Hogancamp ........ C04B 20/1037 |

FOREIGN PATENT DOCUMENTS

| | | |
|---|---|---|
| WO | 2013096990 A1 | 7/2013 |
| WO | 2015108990 A1 | 7/2015 |
| WO | 2016040612 A1 | 3/2016 |

OTHER PUBLICATIONS

International Search Report and Written Opinion—PCT/US2020/048051—Dec. 3, 2020.

* cited by examiner

CONCRETE PRODUCT AND METHODS OF PREPARING THE SAME

CROSS REFERENCE TO RELATED APPLICATIONS

This patent application claims priority to and the benefit of U.S. Provisional Patent Application No. 63/057,254, entitled "A CONCRETE PRODUCT AND METHODS OF PREPARING THE SAME," filed on 27 Jul. 2020, the contents of which are hereby incorporated herein by reference in their entirety as if fully set forth below and for all applicable purposes.

FIELD

The present disclosure generally relates to concrete construction processes and to the formation of concrete products. The present disclosure is more specifically directed to concrete products and a method of preparing and pouring a concrete slurry for the formation of concrete products.

BACKGROUND

Concrete products, such as concrete slabs (floor slabs, foundation slabs), concrete rafts, concrete pillars and columns, etc., are usually composed of unreinforced or reinforced concrete. The level of reinforcement generally is dictated by at least the intended use, the exposure to the elements, the load, and the loading intensities, amongst various other factors.

Reinforcement also is used to control cracking or fracturing, which is common throughout the useful life of a concrete product. Cracking or fracturing may be caused by shrinkage, flexing (flexural moment), substrate and foundation settlement, and punching-out of point loadings, amongst various other factors.

Cracks or fractures provide a path for evaporating molecules to escape. Cracks or fractures penetrate the concrete, which promote chemical erosive reactions within the concrete, and which cause corrosion of the reinforcement structures contained therein. Cracks or fractures also function as channels for liquid to seep deep into the concrete, to the point of saturation, which further erodes the concrete, via freeze (expansion) and thaw (constriction) cycles.

Various unsuccessful attempts have been made in the field to mitigate cracking or fracturing, to minimize the width of cracks or fractures that do form, and to avoid various other problems related to cracking or fracturing. Solutions have been conceived to vary the composition of the concrete mixture, and/or to vary the methods of preparing the concrete mixture into a concrete slurry, and/or to vary the ballast material used in forming the final concrete product. These possible solutions, however, usually require a concrete formulation comprising expansive admixtures with the hope of countering the shrinkage of the concrete and the loss of water. In these solutions it is difficult to determine the proper amount of expansive admixtures required to counter the shrinkage.

The use of such unsuccessful solutions usually gives rise to unpredictable results, in particular, results requiring concrete-producing entities to employ one or more solutions to mitigate the risk of concrete slab failure. This adds unnecessary complexity and unforeseen consequences, as is described herein.

As another unsuccessful solution, it is common to employ joint cutting techniques during formation of a concrete product. Joint cutting or joint-making in an already-placed concrete slab commonly is used to divide at least a portion of a thickness of a concrete slab into adjacent partitioned slabs, such that any shrinkage or contraction of the concrete is localized to the cut-line or joint and, thereby, will minimize such formations at other portions of the partitioned slab.

Cut joints may come in various forms such as saw-cutting a slab at 5.0 meters (m) to 15.0 m intervals at full or partial depth, or full-depth construction joints at similar intervals. Certain regulatory agencies have guidelines recommending joints at about 14.0 feet (') distances for a 6 inch (") thick slab, and at about 17.0' distances for an 8" thick slab. Shrinkage in the concrete along the cut joint ultimately will cause the joint to open and curl along the edges of the adjacent partitioned slabs, especially if the shrinkage is greater along the more-superficial (shallower) portions of concrete than along the more-profound (deeper) portions of concrete. The thinner the individual slab, the faster it will curl. This, however, is but one of various deficiencies in the joint-cutting process. Joints, for example, are commonly known to be expensive to install and are not applicable to the formation of certain concrete products such as vertical walls, columns, pillars, etc.

It is, therefore, desirable to overcome the deficiencies of and provide for improvements in the state of the prior art.

Improved methods, process, and systems in the formation of concrete products are discussed and taught in this disclosure. As used herein, any reference to an object of the present invention should be understood to refer to solutions and advantages of the present invention, which flow from its conception and reduction to practice, and not to any a priori or prior art conception. A better understanding of the principles and details of the present invention will be evident from the following description.

SUMMARY

Exemplary embodiments are directed to a system for, and a method of, forming concrete products like concrete slabs and rafts and molded concrete products, based on a uniquely prepared concrete mixture and/or a unique curing technique. Exemplary embodiments also are directed to a system for, and a method of, forming concrete products, based on a synergistic combination of a uniquely prepared concrete mixture with a unique curing technique. Exemplary embodiments also are generally directed to a process for the formation of concrete products that is more efficient and effective, and that reduces the carbon footprint, energy consumption, and environmental costs of preparing, placing, and producing concrete products.

In one exemplary embodiment, a concrete product may be set by pouring a concrete slurry. In an exemplary embodiment, the poured concrete slurry comprises a) a concrete mixture, b) an aluminum-coated colloidal silica admixture, and c) optional graphene oxide and/or at least one fiber selected from the group of fibers consisting of steel fibers and synthetic fibers. As the poured concrete slurry cures, the poured slurry hardens into a composite material taking the form of a concrete product, and the concrete product defines capillary structures that at least in part fill with silica and lime. The silica and lime react therein to produce a gel structure of calcium silicate hydrate that at least partially fills the capillary structures, and that reduces the internal tensile forces acting on the concrete product. Similarly, in embodiment with the optional graphene oxide, the hardened aggregate and cement of the concrete product defining the capillary structures is embedded with dispersed graphene oxide particulates that provide stiffness and strength to, and reduce or prevent over-drying, shrinkage, and cracking or fracturing of the concrete product.

In another exemplary embodiment, the aluminum-coated colloidal silica admixture is amorphous colloidal silica coated in aluminum ions, in an aqueous solution, wherein the silica particles have a size ranging from between about 3.0 nanometers (nm) to about 100.0 nm. The concrete mixture comprises aggregate, cement, and water, wherein the concrete mixture is defined by a water to cement ratio of between about 0.400 to about 0.450. The optional at least one fiber selected from the group of fibers represents between about 0.25 percent (%) by volume to about 0.50% by volume of the poured concrete slurry, or more specifically between about 0.20% by volume to about 0.50% by volume of the poured concrete slurry.

In another exemplary embodiment, the concrete product is set by pouring a concrete slurry and then applying a curing technique to the poured and set concrete slurry. In an exemplary embodiment, the curing technique may comprise spray-applying a secondary application of the aluminum-coated colloidal silica and/or a first application (in an exemplary embodiment where no colloidal silica of any type is integral to the concrete slurry prior to the spray-applying step) onto the poured and set concrete slurry. The spray-applied mixture can be applied using pump sprayers, walk-behind electric-powered "turf" sprayers, and the like, and includes all manner of spraying a liquid solution onto a surface.

In another exemplary embodiment, the present invention is directed to a process for preparing a concrete product. In an exemplary embodiment, the process comprises the steps of a) preparing a concrete slurry comprising i) a concrete mixture, ii) a colloidal silica admixture, and iii) optional graphene oxide and/or at least one fiber selected from the group of fibers consisting of steel fibers and synthetic fibers; b) pouring the concrete slurry onto the substrate; and c) allowing the concrete slurry to cure such that capillary structures develop as the concrete product sets from the poured concrete slurry. The capillary structures of the concrete product at least in part fill with aluminum-coated silica particles and lime, and the silica particles and lime react to produce a gel structure of calcium silicate hydrate that at least partially fill the capillary structures. In an exemplary embodiment with option graphene oxide, the surrounding structure defining the capillaries of the concrete product have the nanometer-sized monolayers embedded therein, and/or overlapping layers of graphene oxide embedded therein.

In an exemplary embodiment, the preparing step comprises preparing the concrete slurry with an amorphous aluminum-coated colloidal silica admixture that is in an aqueous solution. The preparing step also comprises preparing the concrete slurry for pouring with dosages of steel fibers as the at least one fiber selected from the group of fibers of between about 33.0 pounds per cubic yard (lbs./cuyd) to about 66.0 lbs./cuyd. The preparing step additionally comprises preparing the concrete slurry for pouring with dosages of macro synthetic fibers as the at least one fiber selected from the group of fibers of between about 3.0 lbs./cuyd to about 7.5 lbs./cuyd.

In another exemplary embodiment, the process additionally comprises the step of spray-applying a secondary aluminum-coated colloidal silica onto the poured concrete slurry to facilitate curing thereof with optional primary or secondary graphene oxide spray application. The spray-applying step comprises spray-applying the primary or secondary graphene oxide application, the primary or secondary aluminum-coated colloidal silica application, and/or the primary or secondary graphene oxide and aluminum-coated colloidal silica composite onto the poured concrete slurry subsequent to removal of a trowel machine, and prior to cement in the poured concrete slurry being completely set, or subsequent to cement in the poured concrete slurry being completely set.

In another exemplary embodiment, a concrete product is provided. The concrete product is set from a concrete slurry poured onto a substrate, the poured concrete slurry comprising a concrete mixture, an aluminum-coated colloidal silica admixture, and optionally graphene oxide and/or at least one fiber selected from the group of fibers consisting of steel fibers and synthetic fibers, the concrete product comprising capillary structures that are at least in part filled with a reaction product of silica and lime, the reaction product being a gel structure of calcium silicate hydrate, whereby the calcium silicate hydrate reduces internal tensile forces acting on the concrete product. In embodiment with the optional graphene oxide, the concrete product also comprises hardened aggregate and cement embedded with the sheared monolayers of graphite oxide powder, whereby the dispersed graphene oxide particulates provide stiffness and strength, and prevent over-drying, shrinkage, and cracking of the concrete product.

In another exemplary embodiment, a jointless fiberless concrete product is set by pouring a concrete slurry onto a substrate. The poured concrete slurry comprises a) a concrete mixture, b) an aluminum-coated colloidal silica admixture, and c) optional graphene oxide but no fibers. As the poured concrete slurry cures, the poured concrete slurry hardens into a composite material taking the form of a concrete product.

In another exemplary embodiment, the jointless fiberless concrete product also is set by pouring the concrete slurry onto the substrate and then spray-applying a primary or secondary graphene oxide application, a primary or secondary aluminum-coated colloidal silica application, and/or a primary or secondary graphene oxide and aluminum-coated colloidal silica composite.

In another exemplary embodiment, a process for producing and placing the jointless fiberless concrete product of the present teachings on a substrate is provided as shown and described herein.

DETAILED DESCRIPTION

Figure 1:
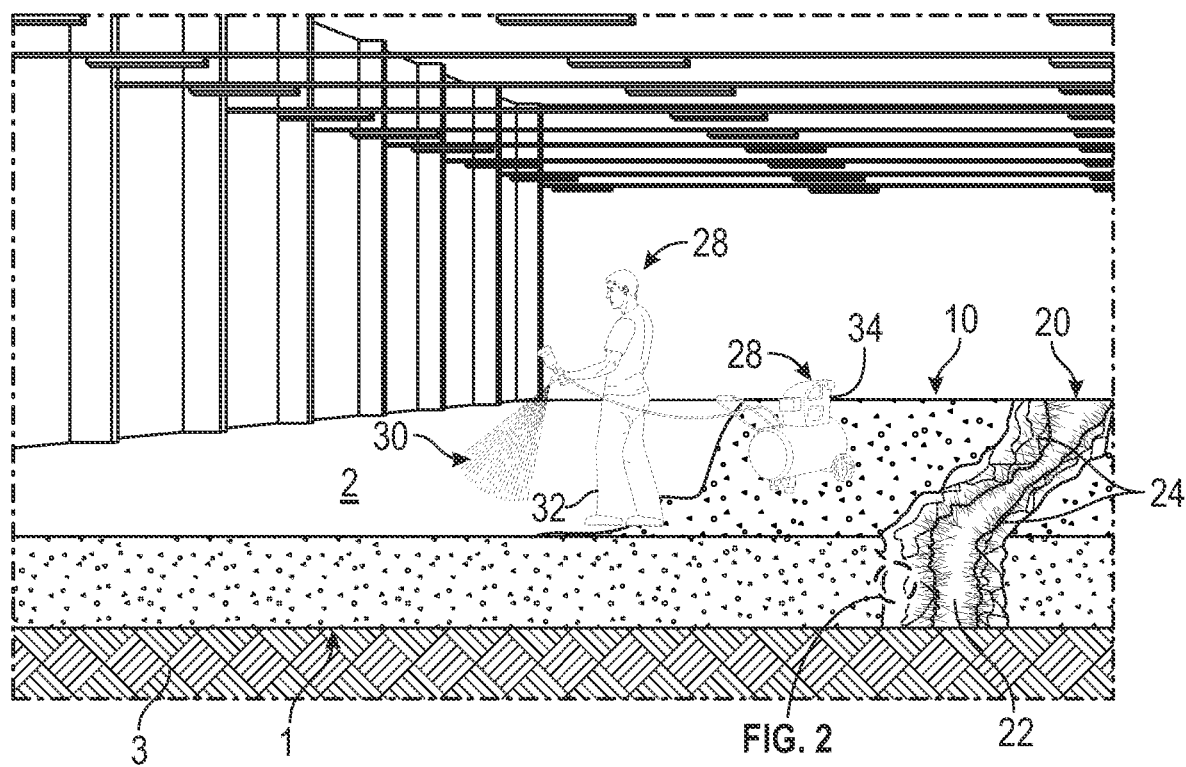
FIG. 1 is a perspective view of an exemplary concrete product of the present invention in the form of a concrete slab.

For a further understanding of the nature, function, and objects of the present invention, reference should now be made to the following detailed description. While detailed descriptions of the preferred embodiments are provided herein, as well as the best mode of carrying out and employing the present invention, it is to be understood that the present invention may be embodied in various forms. Specific details disclosed herein are not to be interpreted as limiting but rather as a basis for the claims and as a representative basis for teaching one skilled in the art to employ the present invention in virtually any appropriately detailed system, structure, or manner.

For purposes of this disclosure, a "jointless" concrete slab refers to a slab that does not have cut joints and that is capable of managing the cracks and fractures without the cut joints. Percent (%) by weight refers to the aggregate weight of the silica particles in comparison to the final weight of cement in a final concrete product. A "fiberless" concrete slab refers to a slab that does not have steel fibers, synthetic fibers, or other like internal reinforcements, and that still remains capable of managing the cracks and fractures without the fibers. This disclosure is not limited to jointless concrete slabs, rafts, or other concrete products, and this disclosure is not limited to fiberless concrete slabs, rafts, or other concrete products.

Embodiments and aspects of the present disclosure provide a system for, and method of, preparing and pouring a concrete slurry for the formation of concrete products, which are not susceptible to the limitations and deficiencies of the prior art. The inventive concepts described herein allow for the formation, in certain non-limiting embodiments, of concrete slabs and rafts, based on the addition of a chemical admixture when preparing the concrete slurry. In other non-limiting embodiments, the inventive concepts described herein allow for the formation of concrete slabs and rafts based on the application of a chemical treatment to a poured concrete slurry, which in some instances facilitates curing of the poured concrete. In other non-limiting embodiments, the inventive concepts described herein allow for the formation of concrete slabs and rafts, based on the synergistic combination of a prepared concrete slurry with a curing technique. Further, the inventive concepts described herein also allow for the formation, in certain non-limiting embodiments, of concrete products that are less susceptible to cracking or fracturing, and that are less susceptible to the complications derived therefrom.

The inventive concepts described herein also allow for a decreased need for and a decreased use of traditional reinforcements such as rebar and/or mattings. This allows for efficiencies in time, labor, and resources, and allows for a streamlining and simplifying of the process for forming and maintaining a concrete product.

A first exemplary embodiment of the inventive concepts provides a system for, and method of, preparing and pouring a concrete slurry for the formation of concrete products, wherein micro- and/or nano-particles and/or fibers are paired with a durable and flexible blend of aggregates, pastes, and admixtures, to provide a mass of substantially impermeable concrete exhibiting exceptional tensile strength and durability for the heaviest loads and equipment.

A second exemplary embodiment provides a system for, and method of, forming of a concrete product via a concrete slurry and curing technique, wherein the concrete slurry leverages aluminum-coated colloidal silica (herein simply, "colloidal silica") in combination with entirely optional graphene oxide and/or fibers (steel and/or macro synthetic, for example) to create a concrete mass. The colloidal silica and graphene oxide composite may be used as an admixture and/or sprayed, individually or in combination, onto the surface as a "cure" soon after or right after the trowel machine is removed.

The colloidal silica and optional graphene oxide work to fill the capillary structure to reduce internal tensile forces or to provide stiffness and strength, which drastically reduces the likelihood of shrinking and cracking of the concrete. With regard to the colloidal silica, open capillaries, or open capillary structures, are filled with reactive nanometer-sized aluminum-coated silica that react with the free lime to produce a stable gel structure of calcium silicate hydrate, which eliminates moisture loss by plugging the pores of the capillary structures. With regard to the optional graphene oxide, the concrete structure defining the capillaries is embedded with nanometer-sized graphene oxide monolayers, which are defined by stiffness and strength due to the presence of a two-dimensional graphene backbone. It is possible that the graphene oxide monolayers may overlap to create an interwoven layer structure that distributes load. These liquid-dispersed monomolecular sheets are defined herein as graphene oxide sheets or flakes. The inventor has also found that this process is not temporary, and is instead a permanent solution.

At this high-level non-limiting example, the use of colloidal silica as an admixture and/or spray works with the internal cement molecule. Colloidal silica, which is included within the category of pozzolans, is a suspension of fine amorphous, nonporous, and typically spherical silica particles in a liquid phase. During curing and thereafter, the colloidal silica will react with free lime, increasing the density and structural strength of the solid structures formed. The increased density and long-term pozzolanic action ties up free lime, which limits the creation of channels and decreases the permeability in the concrete structure. Moreover, the resultant chemical and structural effect also helps keep contaminants and particles on the surface of the concrete. Moreover, due to the aluminum coating, the colloidal silica helps buffer against the effects of fly ash, which varies geographically (based on how the concrete materials are sourced), and therefore helps yield a more consistent final product independent of where the concrete is being placed.

The use of the optional dispersed graphene oxide flakes as an admixture and/or spray in an exemplary embodiment works to prevent shrink cracking and moisture loss and provides a reinforcement effect to the concrete product. Graphite oxide generally is hydrophilic and easily hydrated when exposed to water in liquid or gas phase, resulting in a distinct increase of the inter-planar distance (up to about 1.2 nm in its saturated state). Additional water may be incorporated into the interlayer space between monolayers of graphene oxide due to high-pressure induced effects. The hydration state of graphene oxide in liquid water corresponds to insertion of about 2-3 water monolayers, for example. Complete removal of water from graphene oxide is known to be difficult as direct heating at 60-80° C. commonly results in partial decomposition and degradation of the chemical structure.

A third exemplary embodiment provides a process for placing a concrete slab on a substrate for industrial and commercial applications. The slab is characterized by having higher than normal resistance to the effects of aggressive water and chemical attack, such as salt, when compared to traditional concrete composite materials. The slab also provides a highly dense, highly accurate, and planar concrete surface with limited internal macro-reinforcements and a thinner cross section than a conventional concrete slab of the same strength.

For this particular embodiment, the process comprises: (1) preparing a concrete slurry with a water to cement ratio of between about 0.400 to about 0.450, with steel fibers or macro synthetic fibers, or a combination of these fibers; (2) preparing the concrete slurry with a colloidal silica, integral thereto; (3) performing a "spray-apply" step using colloidal silica; and (4) providing reaction and performance enhancing chemicals to the slurry or to the curing/to-be finished product. The overall process comprises establishing a highly accurate, and well compacted sub-base preparation as a foundation in preparation for placement of the concrete. Optionally, the preparing the concrete slurry step may comprise graphene oxide, integral thereto.

A fourth exemplary embodiment provides a method comprising the entirely optional step of using steel fibers to mitigate shrinkage cracks in the concrete. Fibers help mitigate plastic and drying shrinkage by arresting the movement of the concrete slab and distributing any shrinkage across the entire slab and fiber network area by means of micro cracking, i.e., when shrinkage occurs the fibers engage and redistribute the shrinkage. This holds true for both steel and macro-synthetic fibers, as described in greater detail herein.

This step may be one step in a series of steps making up an exemplary embodiment. As is described in greater detail herein, shrinkage cracks occur either as early plastic shrinkage, nucleating in the first 24 hours while the concrete has low strength, or nucleating as late cracks, due to the external restraint of the volume change during the drying shrinkage. As water is lost in the cement paste, shrinking places the aggregates in compression. Fine and discrete cracks nucleate and extend from the perimeter of the aggregates, and the numerous fine cracks continue to extend, while shrinkage increases over time and the cracks coalesce. As the concrete slab shrinks, the concrete slab shortens in all directions. The microcracks then combine at the location of the greatest strain and stress, where subsequently a crack will form.

For this particular embodiment, the step of using steel fibers to mitigate shrinkage cracks in the concrete allows for fibers to be randomly distributed throughout the concrete slab and can, with close spacing and good bonding, intercept the formation of cracks. Different types of steel fibers may be used for different applications. Some Type 2 steel fibers are sized to number about 9000.0 fibers per pound (lb.) and are used typically in dosages of about 33.0 lbs./cuyd (representing about 0.25% by volume of concrete) to about 66.0 lbs./cuyd (representing about 0.50% by volume of concrete). Some Type 1 steel fibers are sized and number about 2500.0 fibers per pound and may also be used.

A fifth exemplary embodiment provides a method comprising the step of using macro synthetic fibers to mitigate shrinkage cracks in concrete. This step may be one step in a series of steps making up an exemplary method of the present invention. The effect of the macro synthetic fibers is similar to the step of using steel fibers to mitigate shrinkage cracks in the concrete. However, the step of using macro synthetic fibers to mitigate shrinkage cracks in concrete also improves water retention and, therefore, assures a more complete hydration of the cement, and may also reduce plastic shrinkage more effectively than steel fibers in some circumstances. Further, the high fiber count associated with the step of using macro synthetic fibers intercepts the formation of microcracks and, therefore, reduces the formation of larger cracks. The macro synthetic fibers also may be added to the concrete in dosage rates of about 3.0 lbs./cuyd representing about 0.20% by volume of concrete to about 7.50 lbs./cuyd, representing about 0.50% by volume of concrete.

A sixth exemplary embodiment provides a method comprising the step of using, preparing, or adding colloidal silica and/or graphene oxide flakes to the slurry. This step may be one step in a series of steps making up an exemplary method of the present invention.

With regard to the graphene oxide fakes, an oxidation product of the compound carbon, oxygen, and hydrogen in variable C:O ratios of between 2.1 and 2.9 is in aqueous solution. In its dry form, it essentially presents as a black powder or soot. The bulk oxidation-product is dispersed in solution and defined as having monomolecular sheets similar to the single-layer spatial arrangement of atoms for graphite but with a larger and more irregular spacing.

The graphene oxide flakes, in comparison to graphite, have monomolecular sheets that are buckled, and the interlayer spacing is about two times larger (~0.7 nm) than that of graphite. The graphene oxide layers are about 1.10±0.20 nm thick and the graphene oxide layers are spontaneously dispersed in a basic solution or mechanically dispersed by sonication in a polar solvent, as needed. Scanning tunneling microscopy shows the presence of local regions where oxygen atoms are arranged in a rectangular pattern with lattice constant of about 0.27 nm×0.41 nm. Graphene oxide has unique surface properties, which make it a very good surfactant material stabilizing various colloidal systems.

For this particular embodiment, the dispersed graphene oxide flake admixture is added to the concrete during the preparation phase in ranges of between about 0.01% to about 0.10% by weight of cement, depending on the concrete slurry design and the application.

With regard to colloidal silica, amorphous nanometer-sized silica ($SiO_2$) in a particle size ranging from between about 3.0 nm to about 100.0 nm, or from between about 5.0 nm to about 100.0 nm, is in aqueous solution and is added to the concrete slurry with an aluminum-coating along with the graphene oxide admixture and the reaction enhancing and workability enhancing (rheology enhancing) admixtures, such as polycarboxylate. The aluminum coated colloidal silica are produced via a preliminary solution, prior to addition to the concrete slurry, through the incorporation of varied aluminized counter-ion conversions of silicic acid. The silica particles in the preliminary solution have varied ionically coated levels of aluminum. The aluminum coated silica solution has a pH from between about 6 to about 10, depending on the level of treatment and the exact counter-ion make-up, and is used to create the final colloidal solution product before addition to the concrete slurry. The colloidal silica will react with the free lime or calcium hydroxide ($Ca(OH)_2$) from the cement hydration to form a solid gel product called CSH, or calcium silicate hydrate ($CaSiO_3$+ $H_2O$).

For this particular embodiment, as is shown in the following Formula 1:

$$Ca(OH)_2 + SiO_2 \Leftrightarrow CaSiO_3 + H_2O \qquad (1)$$

the colloidal silica aqueous solution is added to the concrete during the preparation phase in ranges of between about 0.50% to about 1.50% by weight of cement, depending on the concrete slurry design and the application. The above-described chemical reaction will consume some of the capillary water and will fill the pores with the hydration products CSH and, therefore, greatly reduce drying shrinkage.

A seventh exemplary embodiment provides a method comprising the step of using a spray-applied colloidal silica and/or graphene oxide as a curing technique. This step may be one step in a series of steps making up an exemplary method of the present invention. Amorphous aluminum-coated colloidal silica with sizes of between about 3.0 nm to about 50.0 nm in an aqueous solution and/or graphene oxide flakes with particles sizes of about 0.5 nm is/are sprayed on a surface of the finished concrete slab after final set of the cement, or as described in greater detail herein.

The nanometer-sized silica penetrates up to about 3.0" deep into the hardened concrete and react with the capillary pore water and available calcium hydroxide to form CSH, calcium silicate hydrate, as described herein. This also will seal the top of the concrete and prevent water from evaporating from the concrete mixture and thus enhance the cement hydration process. The spray-applied colloidal silica can be applied using a pump sprayer, a walk-behind electric-powered "turf" sprayer, and the like, as well as custom-made automated spraying machines. The entire surface of the slab is sprayed such that the nanometer-sized silica and/or graphene oxide penetrate and complete the filling of the capillary structures. This process step of spray-applying colloidal silica may occur after the concrete has been trowel finished and can be walked on without imprinting the surface.

An eighth exemplary embodiment provides a system for, and a method of, preparing and pouring a concrete slurry with colloidal silica, as described herein, for the formation of concrete products, wherein a polycarboxylate ether-based superplasticizer admixture is paired with the cement mixture, aluminum-coated colloidal silica admixture, and/or the secondary spray-applied aluminum-coated silica. With a relatively low dosage (0.15-0.30% by weight of cement, for example), a polycarboxylate ether-based superplasticizer allows water reduction due to its chemical structure, which enables good particle dispersion. Polycarboxylate ether-based superplasticizers are composed of a methoxy-polyethylene glycol copolymer (side-chain) grafted with methacrylic acid copolymer (main-chain). The carboxylate group —COO—Na+ dissociates in water, providing a negative charge along the polycarboxylate ether-based superplasticizer backbone. The polycarboxylate ether-based superplasticizer backbone, which is negatively charged, permits the adsorption on the positively charged colloidal particles. As a consequence of polycarboxylate ether (PCE) adsorption, the zeta potential of the suspended particles changes, due to the adsorption of the COO— groups on the colloid surface. This displacement of the polymer on the particle surface provides the side chains the opportunity to exert repulsion forces, which disperse the particles of the suspension and helps avoid friction.

A ninth exemplary embodiment provides a method of preparing a graphene oxide and colloidal silica admixture comprising the step of adding graphite oxide powder to a colloidal silica admixture, and either mechanically shearing the composite with a high-shear mixing device, and/or mechanically shearing the composite via probe sonication with an ultrasonic cavitation device, such that the resulting graphene oxide flakes are dispersed into the colloidal silica admixture. The resulting composite admixture may then be mixed into a concrete mixture as described herein.

A tenth exemplary embodiment provides a method of preparing a colloidal silica and/or graphene oxide spray application and using it as specific chemical treatment for a poured concrete slurry, which may be prepared without graphene oxide or colloidal silica, whereby the spray application facilitates curing of the poured concrete. This method can be used for the formation of any concrete product like a concrete slab or raft, or any molded concrete product, etc.

FIG. 1 shows a perspective view of an exemplary slab 1. The slab 1 of FIG. 1 is shown placed in warehouse-type setting according to an exemplary embodiment. The slab 1 is placed on top of a leveled and compacted substrate 3 and is for industrial and commercial applications in this exemplary embodiment. The slab 1 is characterized by being virtually free of curling and cracking, and having superior abrasion-resistance.

The slab 1 is illustrated in partial cut-away form to show layers of internal composition and structure of the composite material. The first cut-away section 10 illustrates the sub-surface, below the curing/to-be finished exterior 2. The sub-surface of the first cut-away section 10 is porous, unfinished and rough. The second cut-away section 20 illustrates the slab 1 having a crack 22 to expose the internal composition of the composite material of the slab 1. In particular, the slab 1 comprises hardened aggregate and cement as well as one or more of steel fibers and macro synthetic fibers 24. However, in other exemplary embodiments, the slab 1 may be made without such steel fibers and/or macro synthetic fibers. The hardened aggregate and cement, as well as steel fibers and macro synthetic fibers 24 if such fibers are included, at least in part define capillary structures 26 (best seen in FIG. 2) throughout the slab 1. In an exemplary embodiment, capillary structures 26 (FIG. 2) are filled with reactive nanometer-sized aluminum-coated silica that react with free lime to produce a stable gel structure of calcium silicate hydrate within the capillary structures 26. The concrete structure defining the capillary structures 26 is embedded with nanometer-sized graphene oxide monolayers or overlapping graphene oxide layers.

The slab 1 is illustrated with an optional and exemplary spray-apply system 28. The system 28 may also be used for spray-applying a secondary colloidal silica 30 as described herein (see FIG. 4 and FIG. 6). The system 28 comprises an optional human operator 32 using an exemplary embodiment of a spraying machine 34. The system 28 optionally is used after a concrete slurry of the present invention is poured, trowel finished, and can be walked on by the human operator 32, without imprinting the surface of the hardening slab 1. The system 28 optionally sprays the entire surface of the slab 1 to saturation such that the nanometer-sized aluminum-coated colloidal silica or the optional graphene oxide flakes in the secondary silica spray 30, or in its own separate spray application, can penetrate the capillary structures 26 and the surrounding concrete structure defining the capillary structures 26.

Figure 2:
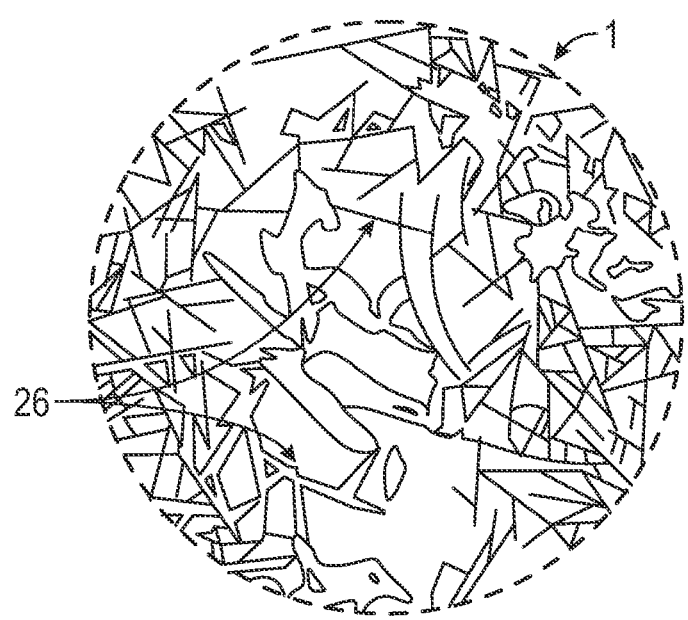
FIG. 2 is a magnified perspective view of a cut-away portion of the concrete slab of FIG. 1.

FIG. 2 is a magnified perspective view of the crack 22 along the second cut-away section 20 of the slab 1 of FIG. 1. The magnified section of FIG. 1 illustrated in FIG. 2 shows a view of the intersection of the hardened aggregate and cement as well as the optional steel fibers and macro synthetic fibers 24, if included, that at least in part define the capillary structures 26 of the slab 1.

Figure 3:
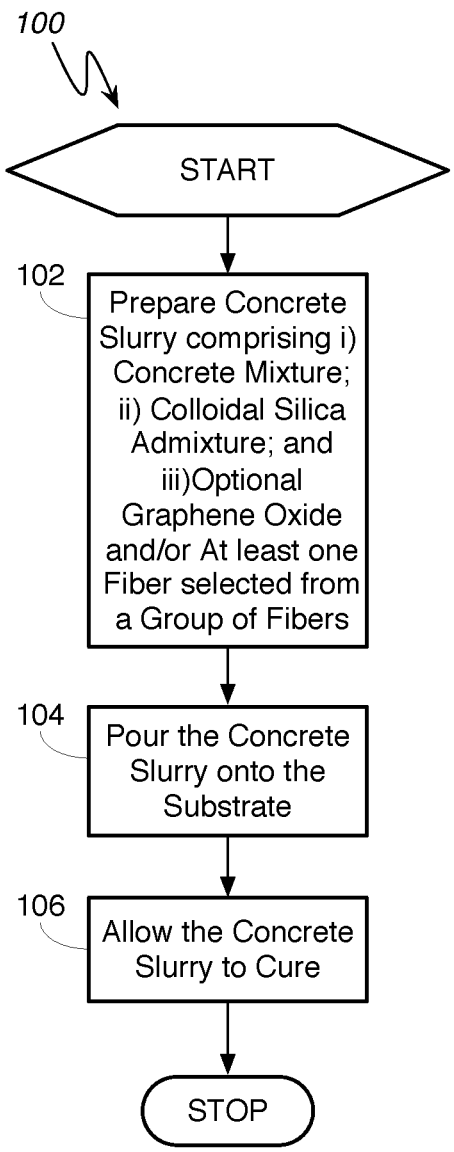
FIG. 3 is a flow diagram showing the steps of a first illustrative embodiment of a method for placing a concrete product of the present invention.

FIG. 3 is a flow diagram of a first illustrative method 100 according to an exemplary embodiment. The method 100 discloses steps, not all of which are necessarily employed in each and every situation, but which may have similarities to other exemplary embodiments provided herein. The steps in the method 100 may be performed in or out of the order shown. The method 100 comprises the steps of: (1) preparing a concrete slurry comprising i) a concrete mixture, ii) colloidal silica admixture, and iii) optional graphene oxide admixture and/or at least one fiber selected from the group consisting of fibers selected from steel fibers and synthetic fibers (102); (2) pouring the concrete slurry onto the substrate (104); and (3) allowing the concrete slurry to cure (106). This method 100 allows the capillary structures to develop as the concrete product sets from the poured concrete slurry, allows the capillary structures of the concrete product to at least in part fill with silica and lime, allows the silica and lime to react to produce a gel structure of calcium silicate hydrate that at least partially fill, respectively, the capillary structures, and allows the concrete structure defining the capillary structures to be embedded with nanometer-sized graphene oxide monolayers or overlapping graphene oxide layers.

In some exemplary embodiments, the preparing step 102 of method 100 comprises: (1) preparing an aluminum-coated colloidal silica admixture via incorporation of varied aluminized counter-ion conversion of silicic acid such that the resultant silica has varied ionically coated levels of aluminum; (2) preparing a graphene oxide and colloidal silica composite admixture comprising the steps of (i) adding graphite oxide powder to the prepared aluminum-coated colloidal silica admixture, and (ii) mechanically shearing the combination with a high-shear mixing device such that the sheared graphene oxide flakes are dispersed into the colloidal silica admixture; and (3) preparing the concrete slurry with the colloidal silica and graphene oxide composite admixture, which comprises silica having a size ranging from between about 10.0 nm to about 100.0 nm, or from between about 5.0 nm to about 100.0 nm, or from between about 3.0 nm to about 100.0 nm, and graphene oxide flakes having a size ranging from between about 1.10±0.20 nm of thickness with size of about 0.5 nm. In another exemplary embodiment, the preparing step 102 comprises providing a prepared aluminum-coated colloidal silica admixture, and preparing a graphene oxide admixture that is independent from the prepared colloidal silica admixture. The admixtures may then be independently, but not necessarily separately, used to prepare the concrete slurry. In another exemplary embodiment, the preparing step 102 comprises preparing the graphene oxide and aluminum-coated colloidal silica admixture(s) comprising the steps of adding graphite oxide powder to an aqueous solution and mechanically shearing the graphite oxide via probe sonication with an ultrasonic cavitation device such that sheared graphene oxide flakes are dispersed into solution.

In another embodiment, the preparing step 102 additionally comprises adding the aluminum-coated colloidal silica admixture to the concrete slurry in ranges of between about 0.50% to about 1.50% by weight of cement in the concrete mixture, wherein % by weight refers to the aggregate weight of the silica in comparison to the final weight of cement in the final concrete product. In another exemplary embodiment, the preparing step 102 comprises adding the graphene oxide flakes, via a composite admixture or an independent graphene oxide admixture, to the concrete slurry in ranges of between about 0.01% to about 0.10% by weight of cement, wherein % by weight in this instance refers to the aggregate weight of the graphene oxide flakes in comparison to the final weight of cement in the final concrete product. In another embodiment, the preparing step 102 additionally comprises preparing the concrete slurry for pouring with dosages of steel fibers as the at least one fiber selected from the group of fibers of between about 33.0 lbs./cuyd to about 66.0 lbs./cuyd. In another embodiment, the preparing step 102 additionally comprises preparing the concrete admixture for pouring with dosages of macro synthetic fibers as the at least one fiber selected from the group of fibers of between about 3.0 lbs./cuyd to about 7.5 lbs./cuyd.

Figure 4:
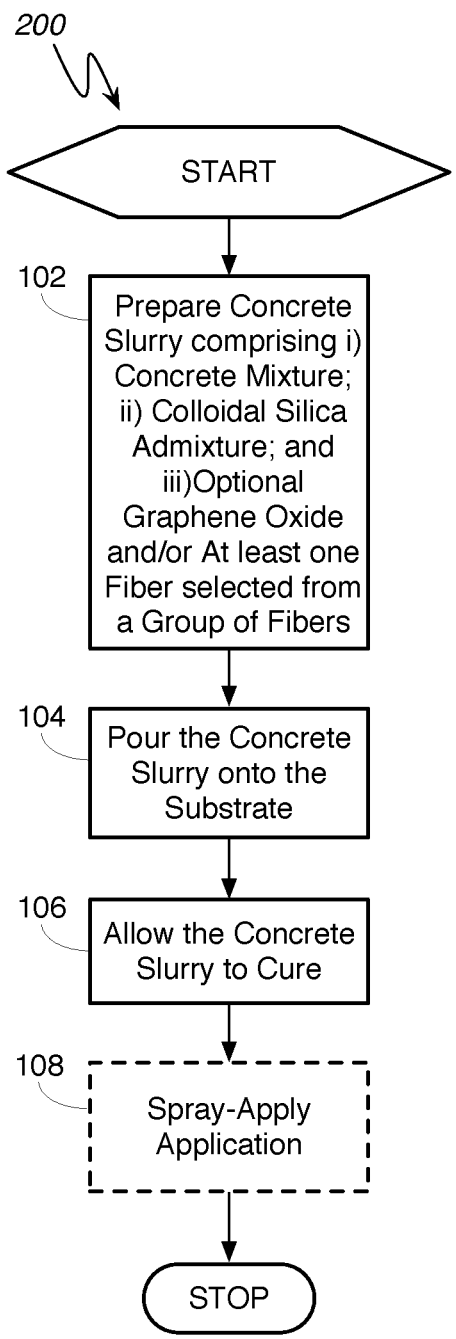
FIG. 4 is a flow diagram showing the steps of a second illustrative embodiment of a method for placing a concrete product of the present invention.

FIG. 4 is a flow diagram of a second illustrative method 200 according to an exemplary embodiment. Some of the steps of the method 200 are identical to the steps in the method 100 of FIG. 3; therefore, only the differences in the method 200 are detailed herein. The method 200 additionally comprises the step 108 of spray-applying a secondary colloidal silica onto the poured concrete slurry to facilitate curing thereof. The spray-applying step 108 comprises spray-applying the secondary colloidal silica onto the poured concrete slurry subsequent to removal of a trowel machine and prior to cement in the poured concrete slurry being completely set. The spray-applying step 108 may comprise in other embodiments spray-applying the poured concrete slurry with an amorphous secondary aluminum-coated colloidal silica in an aqueous solution. The spray-applying step 108 also may comprise spray-applying the secondary colloidal silica onto the poured concrete slurry subsequent to cement in the poured concrete slurry being completely set, and spray-applying to the point of saturation or "flooding state" as is known in the art.

In some exemplary embodiments, the step 108 of method 200 comprises spray-applying a graphene oxide and colloidal silica composite admixture similar to the composite admixture defined herein for certain embodiments of step 102. In another exemplary embodiment, the step 108 of method 200 comprises spray-applying a prepared aluminum-coated colloidal silica admixture and a graphene oxide admixture prepared at the point-of-use and that is independent from the prepared aluminum-coated colloidal silica admixture used for the concrete slurry, those admixtures as defined herein for certain embodiments of step 102.

Figure 5:
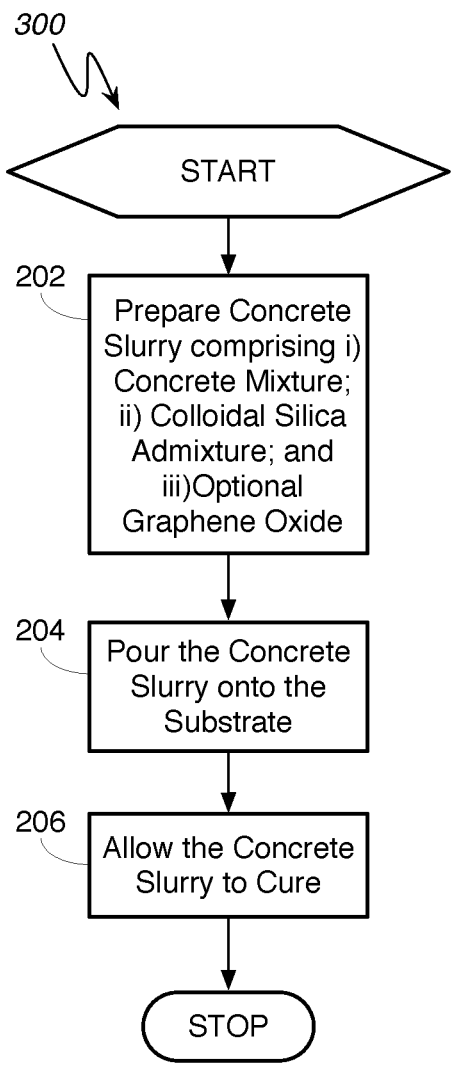
FIG. 5 is a flow diagram showing the steps of a third illustrative embodiment of a method for placing a concrete product of the present invention.

FIG. 5 is a flow diagram of a third illustrative method 300 according to an exemplary embodiment. In an exemplary embodiment the method 300 comprises the steps of: preparing a concrete slurry comprising i) a concrete mixture, ii) a colloidal silica admixture (202), and optional graphene oxide admixture; pouring the concrete slurry onto the substrate (204); and allowing the concrete slurry to cure (206), such that capillary structures develop as the concrete product sets from the poured concrete slurry, such that the capillary structures of the concrete product at least in part fill with silica and lime, such that the silica and lime react to produce a gel structure of calcium silicate hydrate that at least partially fill, respectively, the capillary structures, and such that the concrete structure defining the capillary structures is embedded with nanometer-sized monolayers or overlapping layers of graphene oxide.

In some exemplary embodiments, similar to those described in connection with FIGS. 3 and FIG. 4, the preparing step 202 of method 200 comprises: (1) preparing a graphene oxide and colloidal silica composite admixture comprising the steps of (i) adding graphite oxide powder to a prepared aluminum-coated colloidal silica admixture, and (ii) either mechanically shearing the combination with a high-shear mixing device, such that the sheared graphene oxide flakes are dispersed into the colloidal silica admixture, and/or mechanically shearing the graphite oxide via probe sonication with an ultrasonic cavitation device, such that sheared graphene oxide flakes are dispersed into solution; and (2) preparing the concrete slurry with the colloidal silica and graphene oxide composite admixture, which comprises aluminum-coated silica having a size ranging from between about 10.0 nm to about 100.0 nm, or from between about 5.0 nm to about 100.0 nm, or from between about 3.0 nm to about 100.0 nm, and graphene oxide flakes having a size ranging from between about 1.10+/−0.20 nm of thickness with size of about 0.5 nm. In another exemplary embodiment, the preparing step 202 comprises providing a prepared aluminum-coated colloidal silica admixture, and preparing an optional graphene oxide admixture that is independent from the prepared colloidal silica admixture. The admixtures may then be independently, but not necessarily separately, used to prepare the concrete slurry.

In another embodiment, the preparing step 202 additionally comprises adding the colloidal silica admixture to the concrete slurry in ranges of between about 0.50% to about 10.0% by weight of cement in the concrete mixture. In another exemplary embodiment, the preparing step 202 comprises adding the graphene oxide flakes, via a composite admixture or an independent graphene oxide admixture, to the concrete slurry in ranges of between about 0.01% to about 0.10% by weight of cement.

Figure 6:
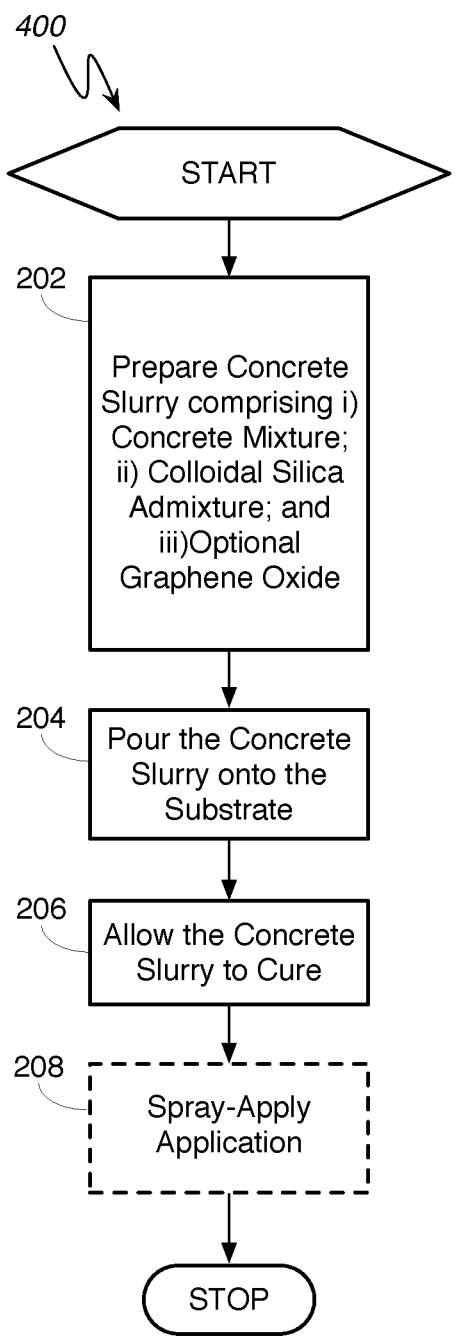
FIG. 6 is a flow diagram showing the steps of a fourth illustrative embodiment of a method for placing a concrete product of the present invention.

FIG. 6 is a flow diagram of a fourth illustrative method 400 according to an exemplary embodiment. Some of the steps of the method 400 are identical to steps in the method 300 of FIG. 5 and, therefore, only the differences in the method 400 are detailed herein. The method 400 additionally comprises the step 208 of spray-applying a secondary colloidal silica onto the poured concrete slurry to facilitate curing thereof. The spray-applying step 208 comprises spray-applying the secondary colloidal silica onto the poured concrete slurry subsequent to removal of a trowel machine and prior to cement in the poured concrete slurry being completely set. The spray-applying step 208 comprises spray-applying the poured concrete slurry with an amorphous secondary aluminum-coated colloidal silica with size ranging from about 10.0 nm to about 50.0 nm, or from about 3.0 nm to about 50.0 nm. The spray-applying step 208 comprises spray-applying the secondary aluminum-coated colloidal silica onto the poured concrete slurry subsequent to cement in the poured concrete slurry being completely set.

In some exemplary embodiments, the step 208 of method 400 comprises spray-applying a graphene oxide and colloidal silica composite admixture similar to the composite admixture defined herein for certain embodiments of step 202. In another exemplary embodiment, the step 208 of method 200 comprises spray-applying a prepared aluminum-coated colloidal silica admixture and a graphene oxide admixture prepared at the point-of-use and that is independent from the prepared aluminum-coated colloidal silica admixture for the concrete slurry, those admixtures as defined herein for certain embodiments of step 202.

Figure 7:
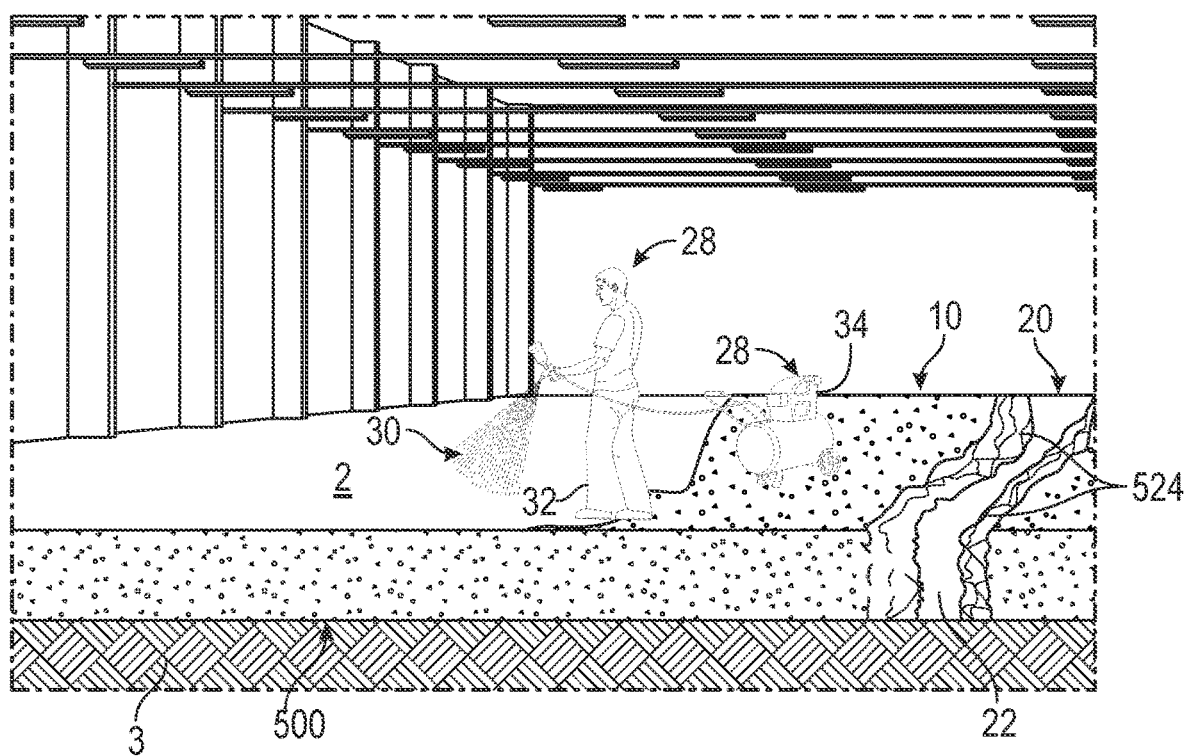
FIG. 7 is a perspective view of an exemplary jointless and fiberless concrete slab of the present invention.

FIG. 7 shows a perspective view of an exemplary jointless and fiberless slab 500. The jointless and fiberless slab 500 is similar to the jointless slab 1 of FIG. 1 and, therefore, only the differences in the jointless and fiberless slab 500 are detailed herein. The jointless and fiberless slab 500 is illustrated in partial cut-away form to show layers of internal composition and structure of the composite material. The second cut-away section 20 illustrates the jointless and fiberless slab 500 having a crack 22 to expose the internal composition of the composite material of the jointless and fiberless slab 500. In particular, the jointless and fiberless slab 500 comprises hardened aggregate and cement 524 without steel fibers and/or macro synthetic fibers. The hardened aggregate and cement 524 at least in part define capillary structures 26 (FIG. 2) throughout the jointless and fiberless slab 500, and the capillary structures 26 (FIG. 2) are filled with reactive nanometer-sized aluminum-coated silica that react with free lime to produce a stable gel structure of calcium silicate hydrate within the capillary structures 26 (FIG. 2). In embodiments that included the optional application of graphene oxide, the hardened aggregate and cement 524 defining the capillary structures is embedded with nanometer-sized graphene oxide flakes or overlapping layers of flakes. An optional spray-apply system 28 may be used for spray-applying a secondary colloidal silica and optional dispersed graphene oxide flake composite 30 on the entire surface of the jointless and fiberless slab 500 to saturation such that the nanometer-sized aluminum-coated colloidal silica in the secondary spray 30 can penetrate and complete the fill of the capillary structures 26, and such that the optional graphene oxide flakes can be dispersed and embedded throughout the hardened aggregate and cement 524.

In one or more exemplary embodiments described herein, the systems and methods described may be implemented in various ways using various methodologies. Although selected aspects have been illustrated and described in detail, it will be understood that various substitutions and alterations may be made therein without departing from the spirit and scope of the present invention, as defined by the following claims.

What is claimed is:

1. A method for producing a concrete product for industrial and commercial applications comprising:
   a) preparing a concrete slurry with a water to cement ratio of between about 0.400 to about 0.450, with fibers selected from the group consisting of steel fibers, macro synthetic fibers, and combinations thereof;
   b) preparing the concrete slurry with an additive selected from the group consisting of colloidal silica, graphene oxide, and combinations thereof; and
   c) pouring the concrete slurry to form the concrete product, wherein the colloidal silica is an amorphous nanometer-sized silica ($SiO_2$) in a particle size ranging from between about 3.0 nm to about 100.0 nm in aqueous solution and the colloidal silica aqueous solution is added to the concrete slurry during the preparation phase in ranges of between about 0.50% to about 1.50% by weight of cement.

2. The method of claim 1, further comprising spray-applying additional quantities of the additive to a surface of the concrete product after the concrete slurry has cured to a desired amount.

3. The method of claim 1, wherein the steel fibers selected from the group consisting of Type 2 steel fibers sized to number about 9000.0 fibers per pound, Type 1 steel fibers sized to number about 2500.0 fibers per pound, and combinations therefor, and the steel fibers are used in dosages in a range of about 33.0 lbs./cuyd, representing about 0.250% by volume of concrete, to about 66.0 lbs./cuyd, representing about 0.50% by volume of concrete.

4. The method of claim 1, wherein the macro synthetic fibers are added to the concrete slurry in dosage rates of about 3.0 lbs./cuyd, representing about 0.20% by volume of concrete, to about 7.50 lbs./cuyd, representing about 0.50% by volume of concrete.

5. The method of claim 1, further comprising providing graphene oxide flakes to the concrete slurry.

6. The method of claim 5, wherein the graphene oxide flakes are dispersed in an aqueous solution and added to the concrete slurry during the preparation phase in ranges of between about 0.01% to about 0.10% by weight of cement.

7. The method of claim 1, wherein the colloidal silica particles have an aluminum coating.

8. The method of claim 1, wherein the colloidal silica reacts with calcium hydroxide (Ca(OH)2) from cement hydration to form calcium silicate hydrate (CaSiO 3+H2O) as a solid gel product.

9. The method of claim 8, wherein the calcium silicate hydrate fills capillary pores in the concrete product when cured.

10. The method of claim 1, wherein the spray-applied additive is sprayed on a surface of the finished concrete product after final set of the cement.

11. The method of claim 10, wherein the spray-applied additive penetrates up to about 3.0" deep into the concrete product when cured and react with water in capillary pores to form calcium silicate hydrate.

12. The method of claim 1, further comprising providing at least one reaction and performance enhancing chemical to the slurry or to the curing/to-be finished concrete product, wherein the at least one reaction and performance enhancing chemical is a polycarboxylate ether-based superplasticizer admixture.

13. The method of claim 1, wherein the additive is a composite of colloidal silica and graphene oxide, wherein the combination is prepared by adding graphite oxide powder to a colloidal silica admixture and mechanically shearing the composite whereby resulting graphene oxide flakes are dispersed into the colloidal silica.

14. A method for producing a concrete product for industrial and commercial applications comprising:
 a) preparing a concrete slurry with a water to cement ratio of between about 0.400 to about 0.450, with fibers selected from the group consisting of steel fibers, macro synthetic fibers, and combinations thereof;
 b) applying the concrete slurry to a substrate;
 c) allowing the concrete slurry to cure to form the concrete product; and
 d) preparing a spray solution comprising an additive selected from the group consisting of colloidal silica with particle sizes of between about 3.0 nm to about 50.0 nm in an aqueous solution, graphene oxide flakes with particle sizes of about 0.5 nm, and combinations thereof, and spray-applying the spray solution to the cured concrete product.

15. The method of claim 14, wherein the spray-applied additive is sprayed on a surface of the finished concrete product after final set of the cement.

16. The method of claim 15, wherein the spray-applied additive penetrates up to about 3.0" deep into the concrete product when cured and react with water in capillary pores to form calcium silicate hydrate.

17. A method for producing a concrete slab on a substrate for industrial and commercial applications comprising:
 a) preparing a concrete slurry comprising a concrete mixture, a colloidal silica admixture, and a graphene oxide admixture;
 b) pouring the concrete slurry onto the substrate; and
 c) allowing the concrete slurry to cure,
whereby capillary pores develop in the concrete as the concrete slab sets from the poured concrete slurry, silica and calcium hydroxide (Ca(OH)2) at least partially fill the capillary pores of the concrete, the silica and calcium hydroxide react to produce a gel structure of calcium silicate hydrate within the capillary pores, and the concrete is embedded with the graphene oxide and wherein the colloidal silica is an amorphous nanometer-sized silica (SiO 2) in a particle size ranging from between about 3.0 nm to about 100.0 nm in aqueous solution and the colloidal silica aqueous solution is added to the concrete slurry during the preparation phase in ranges of between about 0.50% to about 1.50% by weight of cement.

18. A method for producing a concrete product for industrial and commercial applications comprising:
 a) preparing a concrete slurry with a water to cement ratio of between about 0.400 to about 0.450, with fibers selected from the group consisting of steel fibers, macro synthetic fibers, and combinations thereof;
 b) preparing the concrete slurry with an additive selected from the group consisting of colloidal silica, graphene oxide, and combinations thereof;
 c) pouring the concrete slurry to form the concrete product; and
 d) spray-applying additional quantities of the additive to a surface of the concrete product after the concrete slurry has cured to a desired amount; and
wherein the spray-applied additive is selected from the group consisting of colloidal silica with particle sizes of between about 3.0 nm to about 50.0 nm in an aqueous solution, graphene oxide flakes with particles sizes of about 0.5 nm, and combinations thereof.

* * * * *